United States Patent [19]

Reuter et al.

[11] Patent Number: 4,595,569
[45] Date of Patent: Jun. 17, 1986

[54] DEVICE FOR DESULPHURIZING AND DENITRATING FLUE GASES BY ELECTRON IRRADIATION

[75] Inventors: Gottfried Reuter, Lemförde; Peter Holl, Tübingen, both of Fed. Rep. of Germany

[73] Assignee: Polymer-Physik GmbH & Co. KG, Fed. Rep. of Germany

[21] Appl. No.: 691,114

[22] Filed: Jan. 14, 1985

[30] Foreign Application Priority Data

Feb. 3, 1984 [DE] Fed. Rep. of Germany ....... 3403726

[51] Int. Cl.⁴ ............................................. B01J 19/08
[52] U.S. Cl. .................................. 422/186; 204/157.3
[58] Field of Search ................ 204/157.1 R, 157.1 H, 204/157.1 P; 55/2; 422/186; 423/235, 242

[56] References Cited

U.S. PATENT DOCUMENTS

| | | | |
|---|---|---|---|
| 4,004,995 | 1/1977 | Machi et al. | 423/235 |
| 4,184,956 | 1/1980 | Azaru et al. | 422/186 |
| 4,507,265 | 3/1985 | Higo et al. | 422/186 |

FOREIGN PATENT DOCUMENTS 53-88656 8/1978 Japan ............................ 204/157.1 H

OTHER PUBLICATIONS

Radiation Phys. Chem., 18, Nos. 1–2 (1981), pp. 389–398.

Primary Examiner—Howard S. Williams
Attorney, Agent, or Firm—Larson & Taylor

[57] ABSTRACT

The present invention provides a process for the desulfurization and denitration of flue gases by electron irradiation of the flue gases to which ammonia has been added prior to the irradiation, wherein for the electrons there are used low-energy sources of electron beams with an acceleration voltage for the electrons of 250 keV, only one of which has an electron exit window, the support lattice of which is formed from several double comb-like bridge elements disconnectably connected with the windowframe, each of which has a main bridge which is provided with a bore as cooling pipe.

The present invention also provides a device for the desulfurization and denitration of flue gases by electron beam irradiation of the flue gases to which ammonia has been added prior to the irradiation, consisting essentially of a reaction canal and two sources of electron beams, wherein low energy sources of electron beams are used with an acceleration voltage for the electrons of 250 keV, of which only one has an electron exit window, the support lattice of which is formed from several double comb-like bridge elements disconnectably connected with the windowframe, each of which has a main bridge which is provided with a bore as cooling pipe, the electrons emerging from the source of electron beams through the electron window passing directly into the reaction canal.

6 Claims, 4 Drawing Figures

DEVICE FOR DESULPHURIZING AND DENITRATING FLUE GASES BY ELECTRON IRRADIATION

BACKGROUND OF THE INVENTION

The desulfurization and denitrification of flue gases from large furnace plant today occupies a very important position for the protection of the environment.

Besides catalytic dry processes and some wet processes, some of which operate simultaneously and some of which operate selectively, in Japan there has been developed in recent years a physical process in which the conversion of $SO_2$ and $NO_x$ is carried out by irradiation with accelerated electrons in the presence of ammonia. There are thereby formed ammonium sulphate and ammonium nitrate which are separated by means of air filter plants. In the case of this process, which is described, for example, In Radiat. Phys. Chem., 18, Nos. 1–2, pp. 389–398/1981, the flue gases are irradiated with two oppositely positioned sources of electron beams of relatively high acceleration voltage (750 keV) in a round flowthrough reactor with simultaneous mixing up.

The electrons accelerated in a vacuum pass out through a first metal foil to the atmosphere (normally air), penetrate through this air gap and pass through a second metal foil into the reaction vessel. The first and second metal foils absorb a considerable part of the electron beam energy. For this reason, they must be cooled by a current of compressed air which is blown through between the metal foils. The metal foils consist, for example, of titanium.

The reactor is of round cross-section; it is only slightly flattened at the places of the electron entry. The reactor vessel is so constructed that the whole of the electron beam is absorbed by the flue gas and as little as possible radiation losses occur on the walls of the reactor.

In order to homogenize the irradiation in the reactor, the gas is additionally circulated by an impeller during the electron bombardment.

The two sources of electron beams are the important part of this process. Thus, the economy as well as the industrial utility depends upon the optimization of these two sources of electron beams.

Due to the use of the sources of electron beams with the relatively high acceleration voltage (750 keV), the following disadvantages result:

(1) Due to the high acceleration voltage of 750 keV, the irradiation can only be economically screened with concrete, which results in an immobility. It is not possible to work in the direct surroundings of the irradiator during the operation.

(2) Due to the fact that a metal foil is provided for the electron emergence from the accelerator and a second metal foil is provided for the electron entry into the reactor vessel, much energy is absorbed by the two metal foils. The compressed air current necessary for the window cooling is partly oxidized to ozone by the electron irradiation. This ozone attacks the apparatus and is a factor which has an adverse effect on the environment. If an inert gas, for example nitrogen, is used for cooling the two foils, then this is very expensive due to the large amounts of cooling gas necessary.

(3) There are no optimum conditions in a round reactor because of the absorption and scattering conditions of the electrons. The absorption of the electrons takes place in the form of a flattened bell-shaped curve (see the ionization curves for one-sided irradiation; FIG. 3 of the accompanying drawings). The scattering of the electrons in the reactor vessel in the case of irradiation with a source of electron beams gives a pear-shaped distribution seen from the electron entry into the reactor.

(4) The electron beam dosage necessary for the irradiation of flue gases lies in the order of magnitude of 2 Mrd. This dosage capacity of the sources of electron beams lies at about 40 Mrd/sec., i.e. the gas exchange in the electron irradiation region must take place at least 20 times per second in order to achieve the most economic irradiation. The smaller is the irradiation field constructed in the case of the same electron beam capacity, then the more favorable are the irradiation conditions.

Therefore, it is an object of the present invention to provide a process and a device which no longer display the above-described disadvantages.

Thus, according to the present invention, there is provided a process for the desulfurization and denitration of flue gases by electron irradiation of the flue gases to which ammonia has been added prior to the irradiation, wherein for the electrons there are used low-energy sources of electron beams with an acceleration voltage for the electrons of 250 keV, only one of which has an electron exit window, the support lattice of which is formed from several double comblike bridges elements disconnectably connected with the window-frame, each of which has a main bridge which is provided with a bore as cooling pipe.

The present invention also provides a device for the desulfurization and denitration of flue gases by electron beam irradiation of the flue gases to which ammonia has been added prior to the irradiation, consisting essentially of a reaction canal and two sources of electron beams, wherein low energy sources of electron beams are used with an acceleration voltage for the electrons of 250 keV, of which only one has an electron exit window, the support lattice of which is formed from several double comb-like bridge elements disconnectably connected with the window frame, each of which has a main bridge which is provided with a bore as cooling pipe, the electrons emerging from the source of electron beams through the electron window passing directly into the reaction canal.

DETAILED DESCRIPTION OF THE INVENTION

Due to the use of an acceleration voltage for the electrons of 250 keV (so-called low energy source of electron beams), the accelerator, electron exit and reaction chamber can be so screened with lead sheeting that, outside of the irradiation apparatus, the X-rays lie below the limit of detection.

In the surroundings of the radiator, in the case of full operation, work can be carried out with limitations for the persons thereby engaged.

The sources of electron beams screened with lead sheeting are movable; for maintenance work, they can be moved away from the irradiation zone with the whole of the screening. They are more compact and cheaper to produce.

The acceleration distance for the electrons is one-staged and only vacuum-insulated so that, for crude industrial use, they are especially suitable because of their ease of servicing.

With the use of an electron exit window with a vacuum-cooled support construction, such as is described in Federal Republic of Germany Patent Specification No. 26 06 169, cooling by blowing in compressed air becomes unnecessary. Thus, it is possible to operate with only one metal foil, i.e. the irradiator is coupled directly on to the reaction vessel, which results in a substantially smaller loss of energy of the electrons in the case of passage through a Lenard window and, in addition, justifies the use of low-energy sources of electron beams.

By means of programmed digital electron beam deflection, the electron distribution in the reaction vessel can be adjusted substantially rectangularly. In combination with an irradiation from two sides, there is given a quasi-rectangular uniform dosage distribution over the cross-section of a rectangular reactor vessel (cf. FIG. 4 of the accompanying drawings, which shows the ionization density in the case of two-sided irradiation as a function of the mass thickness radiated through in $g/m^2$). The uniformity of the irradiation can be improved by the production of a turbulence within the reactor or, better, within the irradiation canal, it being a continuous process.

A contamination of the electron exit window by reaction products is not to be expected since, in the case of the deposition of such products on the window, a self-cleaning effect takes place. The window foil warms up at points of high mass thickness and the products are thereby detached. Therefore, the electron exit window is preferably arranged vertically in order that such solid materials are automatically detached and cannot deposit at the point of the electron exit because of the effect of gravity.

Because of the high dosage rate of sources of electron beams, in the case of constant electron current, the surface of the electron exit is to be kept as large as possible in order to be able to adapt the electron current density to the velocity of the gas flux.

The scanning system is especially well suited for this purpose. With it there is achieved a large-surface irradiation and thus a broad reaction canal. The depth of the reaction canal is determined by the acceleration voltage and thus by the depth of penetration of the two sources of electron beams.

The gas stream, i.e. the irradiated amount of gas, depends upon the dosage necessary for the chemical conversion. For this purpose, Bailey and Wright (Paint Technology, 35/1971, issues 9–12), have given the following formula, which is very useful in practice:

$$\dot{R} = \frac{100 \cdot I_{Obj} \cdot U_{Obj}}{0.6 \cdot r_o \cdot x_o \cdot Y_o} \text{ (Mrd/sec)}$$

wherein R is the dosage rate
  $I_{obj}$ is the electron stream in mA flowing after the electron exit window into the object
  $U_{obj}$ is the electron radiation energy in keV still present after passage through the electron exit window
  $r_o$ is the maximum range of the electron in the object in $mg/cm^2$
  $x_o$ is the length of the electron exit window in cm.
  $y_o$ is the width of the electron exit window in cm.

The present invention is further explained in the following with reference to the accompanying drawings and to a specific example. In the drawings.

EXAMPLE

Figure 1:
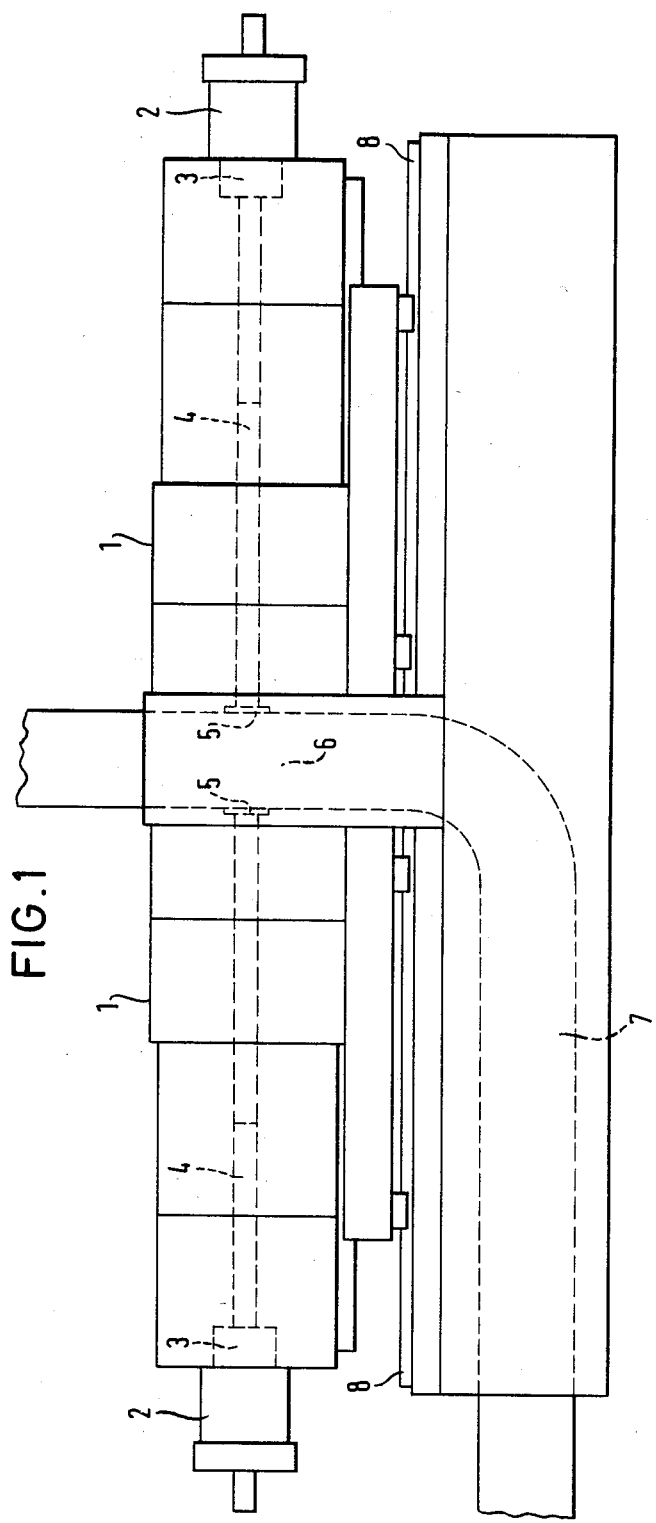
FIG. 1 shows a cross-section through the irradiation device.
Figure 2:
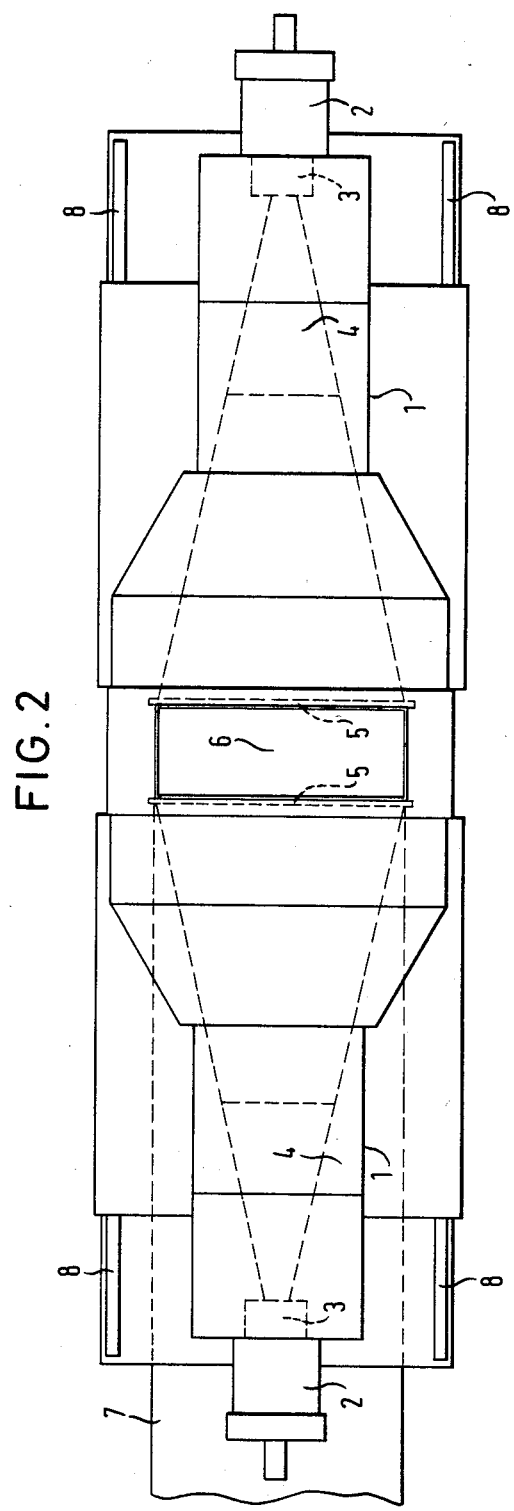
FIG. 2 shows a plan view of the irradiation device.
Figure 3:
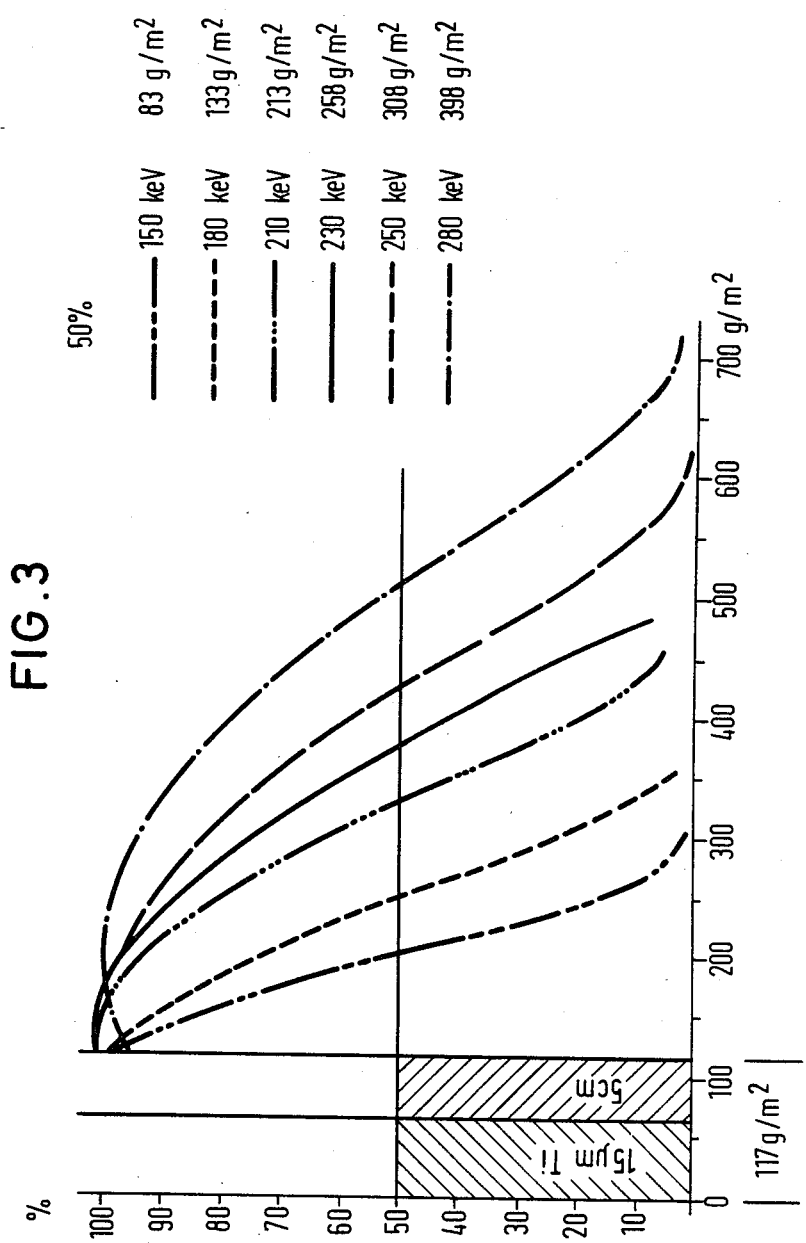
FIG. 3 shows the bell-shaped course of an ionisation curve in the case of one-sided irradiation.

In FIGS. 1 and 2 of the accompanying drawings, there is illustrated a practical embodiment of an electron irradiation plant of the low-energy type, with two oppositely-lying sources of electron beams. The plant has the following operational data:
  acceleration voltage: 250 keV
  acceleration voltage in the object: 250 keV
  electron current: 150 mA
  electron current in the object: 75 mA
  effective penetration depth in the case of one-sided irradiation: 58 $mg/cm^2$
  dimensions of the electron exit window: 140×10 cm.

This gives a dosage rate for a source of electron radiation of $$\dot{R} = \frac{100 \cdot 75 \cdot 230}{0.6 \cdot 58 \cdot 140 \cdot 10} = 35.4 \text{ Mrd/sec.}$$

In the case of a volume stream of 212.4 m./min., this corresponds to a radiation dosage of 1 Mrd.

Figure 4:
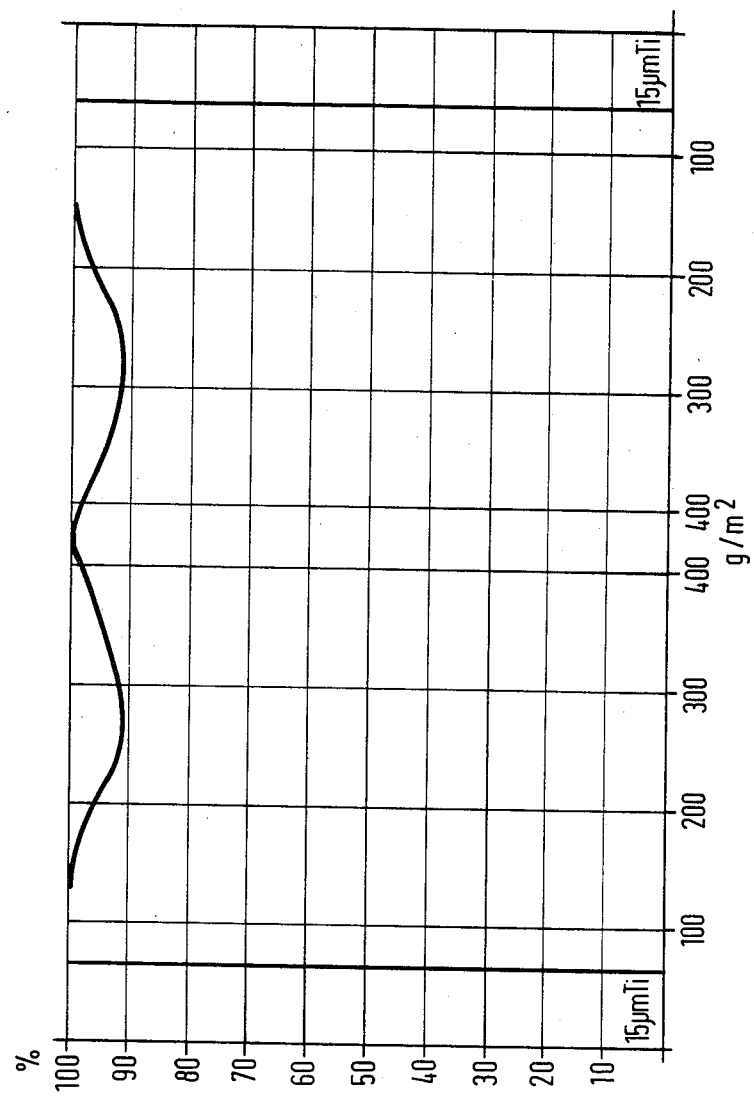
FIG. 4 shows the course of the ionisation curves in the case of two-sided irradiation.

In the case of a two-sided irradiation, according to FIG. 4, the distance of the electron exit window of the two sources of electron beams can be fixed at a distance of 0.5 m.

In the case of an irradiation dosage of 3 Mrd, this gives a gas stream of 70.8 m./min. and, in the case of a reactor cross-section of 1.4×0.5 $m^2$, a throughput of 2973.6 $m^3/h$.

The sources of electron beams are arranged horizontally and are placed in a gas-tight manner with their vertically arranged electron exit windows directly on the reaction canal.

For maintenance work, the sources of electron beams can be moved away completely from the reaction canal with their X-ray screening.

The references used in FIGS. 1 and 2 of the accompanying drawings have the following meanings:
  1: lead sheeting screening
  2: electron accelerator
  3: digital electron beam deflection
  4: scanning system
  5: electron exit window
  6: reaction canal
  7: gas inlet canal
  8: tracks for the opening of the electron irradiation plant.

We claim:
1. Device for the desulfurization and denitration of flue gases by electron beam irradiation of the flue gases to which ammonia has been added prior to the irradiation, consisting essentially of a reaction canal and two sources of electron beams, wherein low energy sources of electron beams are used with an acceleration voltage for the electrons of 250 keV, of which each has only one has an electron exit window, the support lattice of which is formed from several double comb-like bridge elements disconnectably connected with the window-frame, each of which has a main bridge which is provided with a bore as cooling pipe, the electrons emerging from the source of electron beams through the electron window passing directly into the reaction canal.

2. Device according to claim 1, wherein the electron exit window is placed vertically in the sources of electron beams employed.

3. Device according to claim 1, wherein the electron beams used have, in cross-section, a rectangular electron distribution by means of programmed digital electron beam deflection.

4. Device according to claim 1, wherein the sources of electron beams used only have a lead sheeting screening.

5. Device according to claim 1, wherein the sources of electron beams used, together with their lead sheeting screening, are arranged movably with regard to the flue gas irradiation zone.

6. Device according to claim 1, wherein the reaction canal is constructed angularly.

* * * * *

UNITED STATES PATENT AND TRADEMARK OFFICE
CERTIFICATE OF CORRECTION

PATENT NO. : 4,595,569
DATED : June 17, 1986
INVENTOR(S) : REUTER ET AL

It is certified that error appears in the above-identified patent and that said Letters Patent is hereby corrected as shown below:

In the ABSTRACT:

Line 7, delete "only one"; and delete "has an" and substitute therefor --each has only one--.

Line 20, after "which" insert --each has-- and delete "has an".

In the CLAIMS:

Column 4, line 67, delete "has an".

Signed and Sealed this

Second Day of December, 1986

Attest:

DONALD J. QUIGG

Attesting Officer

Commissioner of Patents and Trademarks